United States Patent
Du et al.

(10) Patent No.: US 7,830,687 B2
(45) Date of Patent: Nov. 9, 2010

(54) ADAPTIVE POWER ELECTRONICS INTERFACE FOR HYBRID ENERGY SYSTEMS

(75) Inventors: Zhong Du, Tallahassee, FL (US); Hui Li, Tallahassee, FL (US)

(73) Assignee: Florida State University Research Foundation, Inc., Tallahassee, FL (US)

( * ) Notice: Subject to any disclaimer, the term of this patent is extended or adjusted under 35 U.S.C. 154(b) by 431 days.

(21) Appl. No.: 11/777,641

(22) Filed: Jul. 13, 2007

(65) Prior Publication Data

US 2008/0144342 A1 Jun. 19, 2008

Related U.S. Application Data

(60) Provisional application No. 60/807,272, filed on Jul. 13, 2006.

(51) Int. Cl.
*H02M 7/49* (2007.01)
*H02M 1/10* (2006.01)
*H02J 3/28* (2006.01)

(52) U.S. Cl. ............... 363/71; 363/43; 363/98; 363/142; 307/45

(58) Field of Classification Search ......... 323/271, 323/906; 363/43, 65, 71, 98, 132, 142; 307/45, 307/72, 77, 82
See application file for complete search history.

(56) References Cited

U.S. PATENT DOCUMENTS

| | | | | | |
|---|---|---|---|---|---|
| 4,052,657 | A | * | 10/1977 | Kleiner et al. | 363/43 |
| 6,005,788 | A | * | 12/1999 | Lipo et al. | 363/71 |
| 6,052,296 | A | * | 4/2000 | Dahler et al. | 363/71 |
| 6,101,109 | A | * | 8/2000 | Duba et al. | 363/71 |
| 6,320,767 | B1 | * | 11/2001 | Shimoura et al. | 363/37 |
| 6,556,461 | B1 | * | 4/2003 | Khersonsky et al. | 363/71 |
| 6,697,271 | B2 | * | 2/2004 | Corzine | 363/71 |
| 7,230,837 | B1 | * | 6/2007 | Huang et al. | 363/71 |
| 7,359,223 | B2 | * | 4/2008 | Datta et al. | 363/71 |
| 7,485,987 | B2 | * | 2/2009 | Mori et al. | 307/63 |

* cited by examiner

*Primary Examiner*—Jeffrey L Sterrett
*Assistant Examiner*—Fred E Finch, III
(74) *Attorney, Agent, or Firm*—Novak Druce+Quigg; Gregory A. Nelson; Eduardo J. Quinones

(57) ABSTRACT

An adaptive hybrid energy system is provided. The system includes a first DC energy source that generates a first DC output by converting a first type of energy into an electrical output. Additionally, the system includes at least a second DC energy source that generates a second DC electrical output by converting a second type of energy into an electrical output. The system further includes a cascaded multilevel converter electrically connected to the first and second DC energy sources to convert a DC electrical output into a sinusoidal electrical output when at least one of the first and second DC energy sources is operable.

21 Claims, 7 Drawing Sheets

ADAPTIVE POWER ELECTRONICS INTERFACE FOR HYBRID ENERGY SYSTEMS

CROSS REFERENCE TO RELATED APPLICATIONS

This application claims the benefit of U.S. Provisional Application No. 60/807,272 filed in the United States Patent and Trademark Office on Jul. 13, 2006, the entirety of which is incorporated herein by reference.

FIELD OF THE INVENTION

The present invention is related to the field of power generation, and, more particularly, to the generation of power using distributed energy sources.

BACKGROUND OF THE INVENTION

A distributed energy system typically involves the generation of energy using a number of low- to mid-capacity power generation sites in lieu of one centrally located, high-capacity plant. Energy can be generated with a distributed energy system using, for example, hydraulic turbines, micro-turbines, photovoltaic devices, fuel cells, and wind-powered generators.

Because distributed energy systems can integrate renewable energy resources such as wind and solar power, they are thought by many experts to be a possible solution to rising oil and natural gas prices. Additionally, because wind power and solar power tend to be "cleaner" sources of energy, distributed energy systems are also thought by many experts to offer a solution to environmental problems arising from the generation of power with more conventional systems such as fossil-fuel-based systems.

One aspect of distributed energy systems not yet adequately addressed is that of a power electronics topology for such system. Although cascaded H-bridge multilevel converters have been proposed for interfacing renewable energy resources, conventional electrical topologies using such converters are thought to have certain inherent limitations. One limitation is that the integrated energy sources typically must be of the same type. Another limitation is that the H-bridges of the conventional cascaded H-bridge multilevel converters generally must maintain a constant DC voltage. These limitations can be a significant impediment to developing hybrid energy system applications, especially those utilizing variable or stochastic energy sources such as wind and solar power.

BRIEF DESCRIPTION OF THE DRAWINGS

There are shown in the drawings, embodiments which are presently preferred. It is expressly noted, however, that the invention is not limited to the precise arrangements and instrumentalities shown.

DETAILED DESCRIPTION

Figure 1:
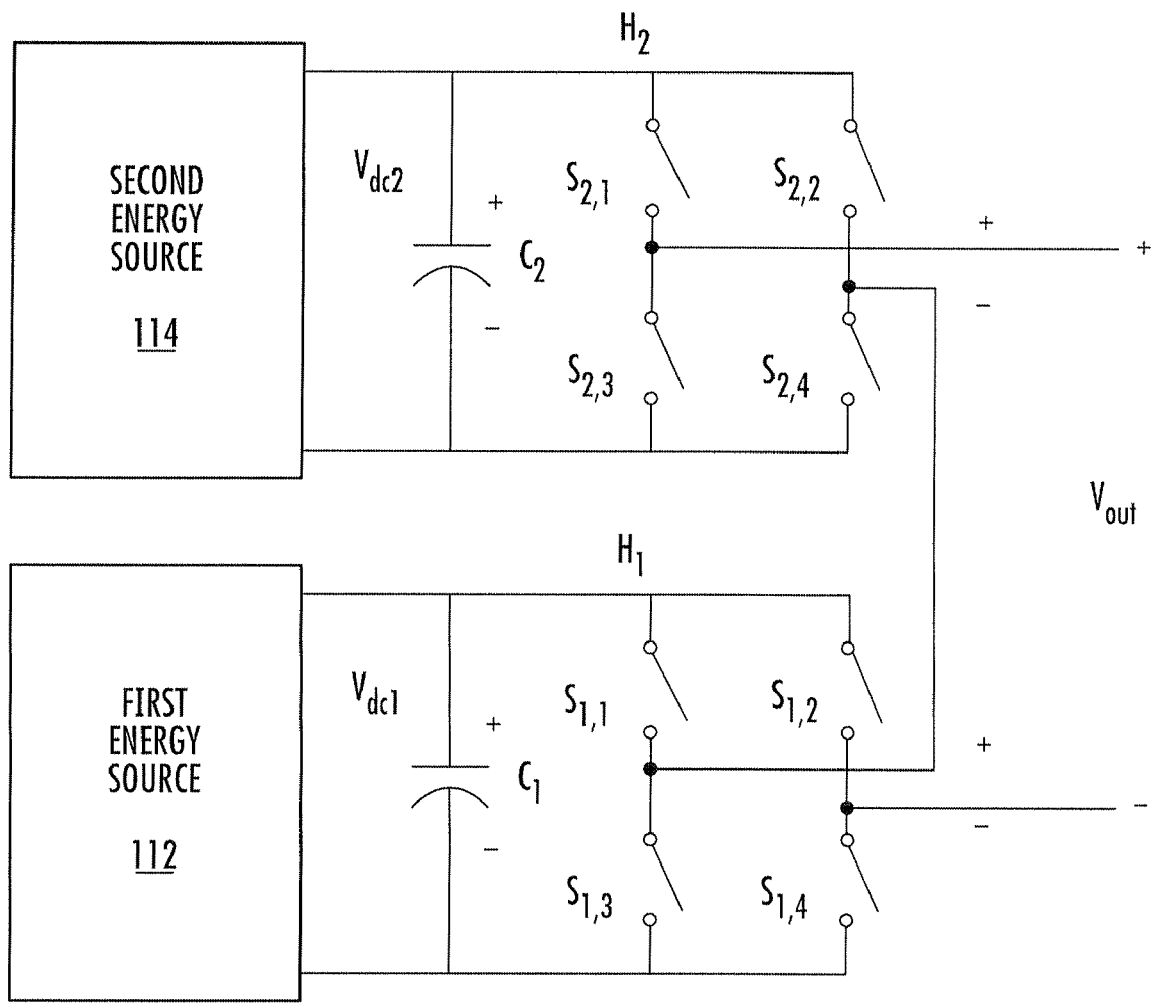
FIG. 1 is a schematic diagram of an electronic topology for an adaptive hybrid energy system, according to one embodiment of the invention.

Referring initially to FIG. 1, an electronics topology for a hybrid energy system 100, according to one embodiment, is schematically illustrated. The system 100 illustratively includes an adaptive power electronics interface 110 comprising a multilevel converter. The multilevel converter of the interface 110 illustratively includes a first H-bridge $H_1$ that connects to a first energy source 112. As shown, the H-bridge $H_1$ illustratively comprises a capacitive element $C_1$ disposed between a two-terminal connection connecting the first energy source 112 and the first H-bridge $H_1$. As also shown, the H-bridge $H_1$ further comprises a plurality of switching elements $S_{ij}$, i=1, j=1, ..., 4.

The adaptive hybrid power electronics interface 110 further illustratively includes a second H-bridge $H_2$ that connects to a second energy source 114, as shown. The second H-bridge $H_2$ also illustratively comprises a capacitive element $C_2$, the capacitive element disposed between two terminals connecting the second energy source 114 and the second H-bridge $H_2$. The second H-bridge $H_2$ also comprises a plurality of switching elements $S_{ij}$, i=2, j=1, ..., 4, as shown.

The first and second energy sources 112, 114 provide DC voltages $V_{dc1}$, $V_{dc2}$ to the corresponding first and second H-bridges $H_1$, $H_2$, respectively. As described herein, the adaptive hybrid power electronics interface 110 operates with the multilevel converter comprising the H-bridges $H_1$, $H_2$ in three modes according to whether the first energy source 112 is in a standalone mode, whether the second energy source 114 is in a standalone mode, or whether both energy sources are providing energy to the multilevel converter in a mixed mode.

Figure 2:
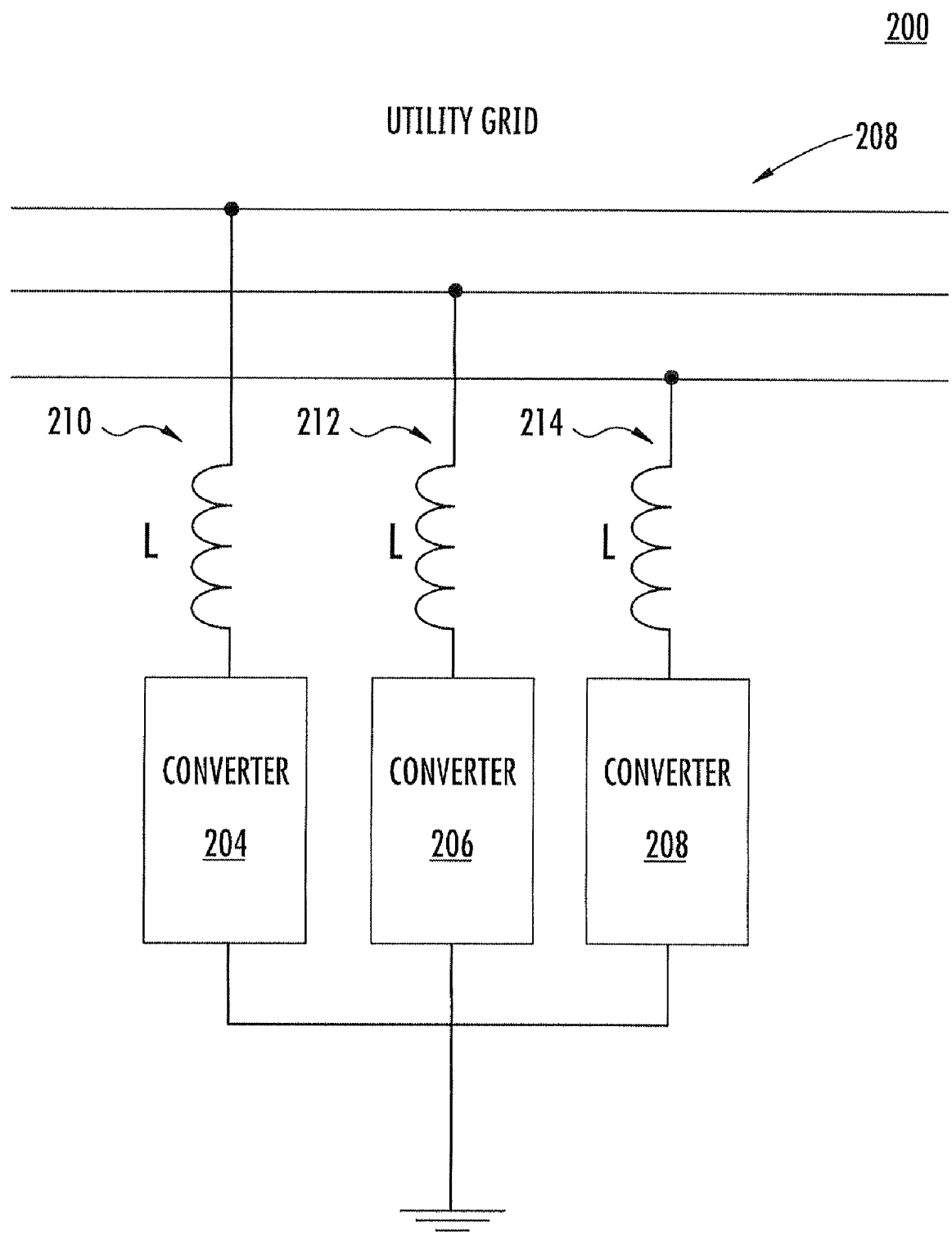
FIG. 2 is a schematic diagram of an electronic topology for a three-phase adaptive hybrid energy system, according to another embodiment of the invention.

FIG. 2 is a schematic diagram of the electronic topology 200 for an adaptive hybrid energy system, according to another embodiment of the invention. The electronic topology 200 provides a three-phase energy system. The electronic topology 200 includes three distinct units 202, 204, 206, arranged as shown, each unit comprising a cascaded H-bridge multilevel converter of the type illustrated in FIG. 1. Each of the units 202, 204, 206 is illustratively connected electrically to a utility grid 208. Illustratively, each of the units 202, 204, 206 is electrically connected to the utility grid 208 through electrical connectors 210, 212, 214 that each comprise an inductive element L disposed between the utility grid and a corresponding one of the units 210, 212, 214.

Figure 3:
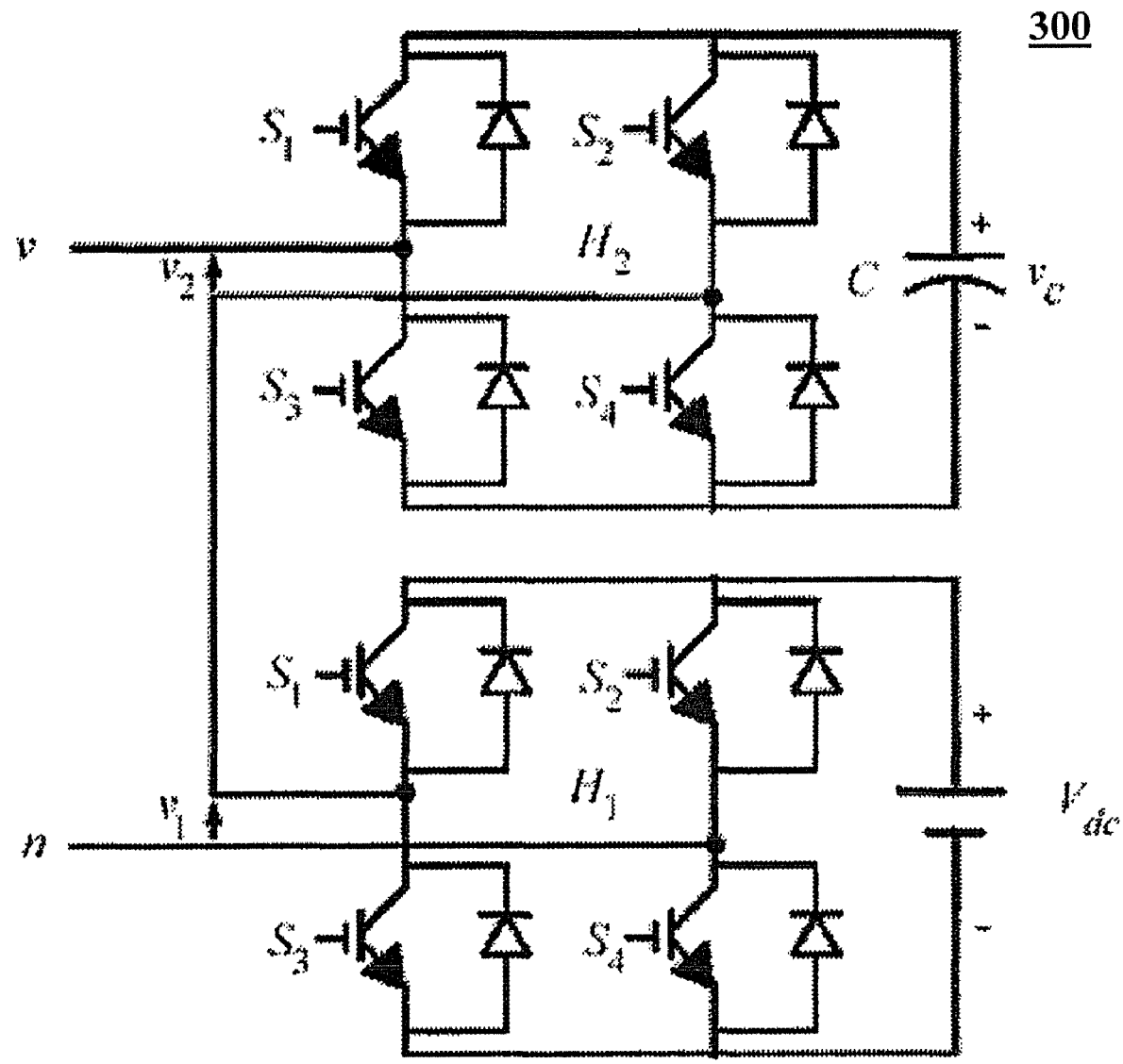
FIG. 3 is a schematic diagram of a single-phase multilevel converter for a hybrid energy system, according to yet another embodiment of the invention.

Referring now to FIG. 3, a cascaded multilevel converter 300 comprising two H-bridge converters $H_1$, $H_2$, according to still another embodiment of the invention, is schematically illustrated. Illustratively, each of the H-bridges $H_1$, $H_2$ comprises a plurality of switches S1, S2, S3, S4 formed by an NPN transistor with a diode connected to the emitter and collector as shown. It will be readily understood by one of ordinary skill that various other types of switches can be used in alternative embodiments, including ones utilizing PNP bipolar junction transistors (BJTs), switches utilizing N-channel and/or P-channel metal-oxide field effect transistors (MOSFETs), or other similar switching devices. Indeed, different solid-state H-bridges can be constructed using a diversity of switching devices, as will be also be readily understood by one of ordinary skill.

A DC source for the first H-bridge $H_1$ can be, for example, a battery, a solar panel, or a fuel cell. The output of the DC source, as indicated, is $V_{dc}$. The DC source for the second H-bridge $H_2$ is the capacitor voltage, which is held at $V_c$. The output voltage of the first H-bridge $H_1$ is $v_1$, and the output of the second H-bridge $H_2$ is $v_2$. Accordingly, the output voltage of the cascaded multilevel converter 300 is $$v(t)=v_1(i)+v_2(t). \quad (1)$$

Depending on the respective states of the switches of the first H-bridge $H_1$, an output voltage $v_1$ can be generated equal to $-V_{dc}$, 0, or $V_{dc}$. Similarly, the output voltage of the second H-bridge $H_2$ can be made to equal $-V_c$, 0, or $V_c$, depending to the respective states of the switches of the second H-bridge. The output of the converter, accordingly, can take on the values $-(V_{dc}+V_c)$, $-V_{dc}$, $-(V_{dc}-V_c)$, $-V_c$, 0, $V_c$, $(V_{dc}-V_c)$, $V_{dc}$, and $(V_{dc}+V_c)$. Thus, the converter can take on nine different output levels.

If all the nine possible levels are used over one cycle, two DC sources are required. The capacitor's voltage, moreover, can not be balanced if only one DC source is used. Based on the fundamental frequency switching method, only seven of the possible output levels are used. One possible cycle is to output $-(V_{dc}+V_c)$, $-V_{dc}$, $-(V_{dc}-V_c)$, 0, $(V_{dc}-V_c)$, $V_{dc}$, and $(V_{dc}+V_c)$. During a charging cycle, the DC source charges the capacitor when the multilevel converter 300 generates the outputs $-(V_{dc}+V_c)$, $-V_{dc}$, $-(V_{dc}-V_c)$.

Another possible cycle occurs when the converter 300 generates the output $-(V_{dc}+V_c)$, $-V_{dc}$, $-V_c$, 0, $V_c$, $V_{dc}$, $(V_{dc}+V_c)$. During this cycle, which can be termed a discharging cycle, the capacitor discharges when the multilevel converter 300 generates the outputs $-V_c$, or $V_c$.

Figure 4:
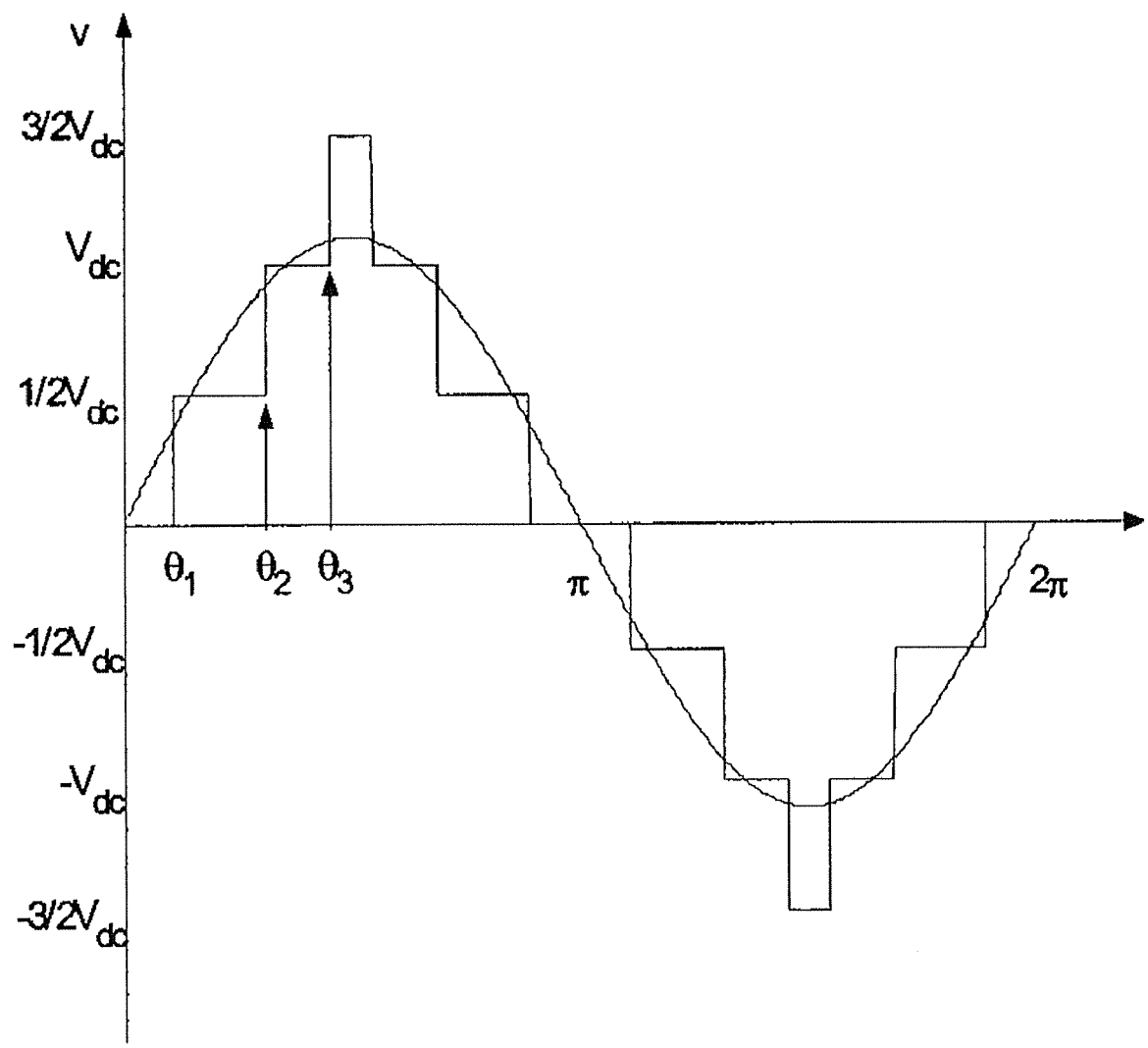
FIG. 4 is a plot of an exemplary output voltage waveform generated by an adaptive hybrid energy system configured in accordance with an electronic topology of the invention.

FIG. 4 is a plot showing seven equal-step output voltage levels over one cycle. The possible combinations of the two H-bridges that can generate seven equal step output voltages levels are shown in Table 1, below.

TABLE 1

| Output voltages for equal seven-level converter | | |
|---|---|---|
| $v_1$ | $v_2$ | $v = v_1 + v_2$ |
| $0 \leq \theta < \theta_1$ | 0 | 0 | 0 |
| $\theta_1 \leq \theta < \theta_2$ | 0 | $V_{dc}/2$ | $V_{dc}/2$ |
| $\theta_1 \leq \theta < \theta_2$ | $V_{dc}$ | $-V_{dc}/2$ | $V_{dc}/2$ |
| $\theta_2 \leq \theta < \theta_3$ | $V_{dc}$ | 0 | $V_{dc}$ |
| $\theta_3 \leq \theta < \pi/2$ | $V_{dc}$ | $-V_{dc}/2$ | $3V_{dc}/2$ |

According to the present invention, the capacitor voltage can remain balanced because, as illustrated by the exemplary seven level equal step output voltages, the output voltage level $V_{dc}/2$ can be achieved in two different modes. The voltage on the capacitor is regulated when the desired output voltage is $V_{dc}/2$. In the context of various practical applications, the capacitor voltage $V_c$ is measured. If $V_c$ is less than $V_{dc}/2$, then $v_1$ is set equal to $V_{dc}$ and $v_2$ is set equal to $-V_{dc}/2$; that is, $v_1=V_{dc}$ and $v_2=-V_{dc}/2$ if $V_c<V_{dc}/2$. Under these conditions, the capacitor is being charged. Conversely, if $V_c$ is greater than $V_{dc}/2$, then $v_1$ is set equal to zero and $v_2$ is set equal to $V_{dc}/2$; that is, $v_1=0$ and $v_2=V_{dc}/2$ if $V_c>V_{dc}/2$. Accordingly, the capacitor is being discharged under these alternate conditions.

Figure 5:
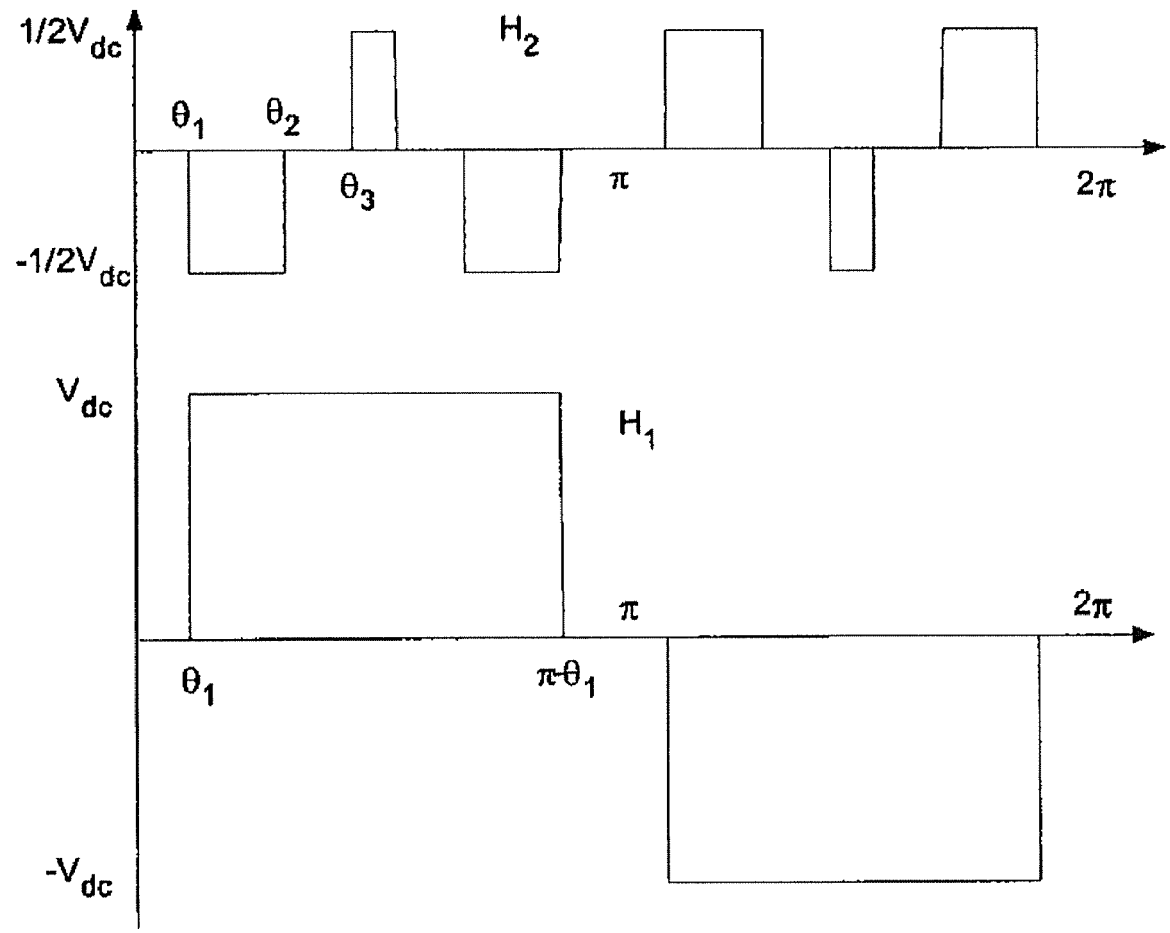
FIG. 5 is a plot of an exemplary capacitor-charging cycle during operation of an adaptive hybrid energy system configured in accordance with an electronic topology of the invention.
Figure 6:
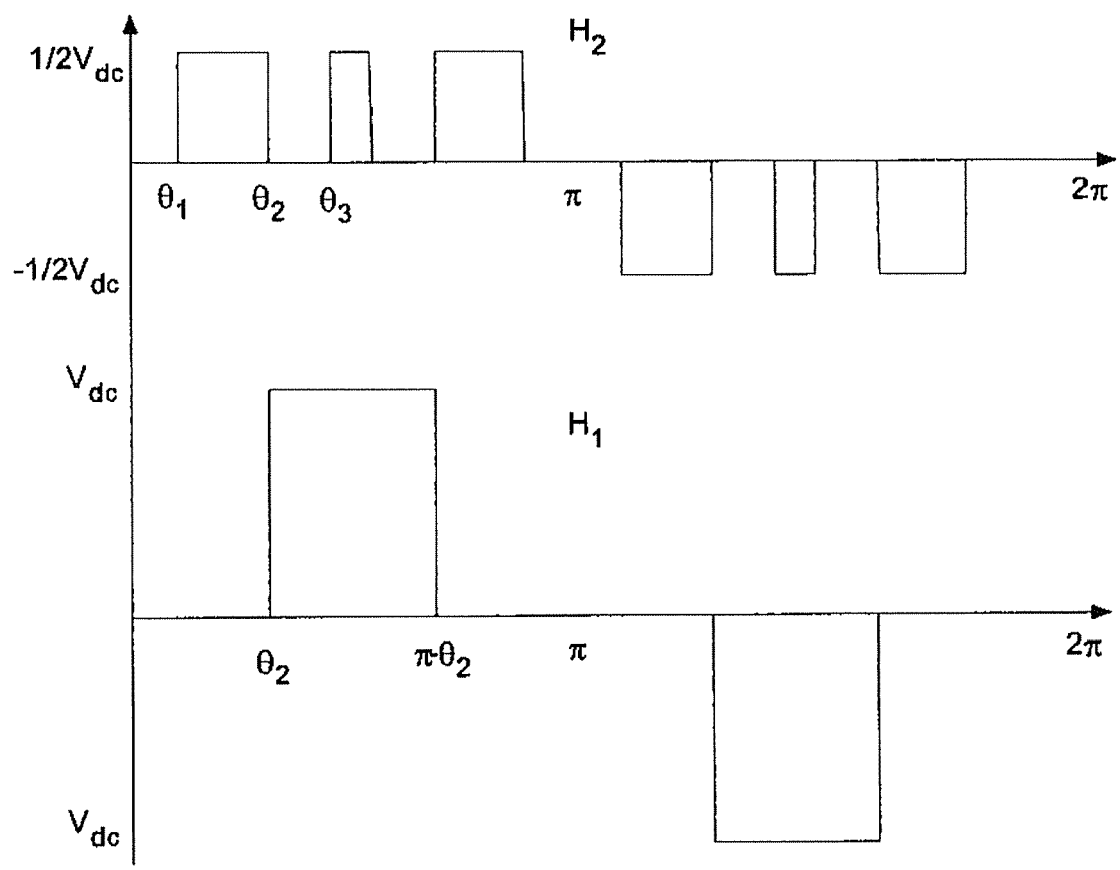
FIG. 6 is a plot of an exemplary capacitor-discharging cycle during operation of an adaptive hybrid energy system configured in accordance with an electronic topology of the invention.

FIG. 5 shows the waveforms generated during the capacitor charging cycle of the multilevel converter 300. By superposition, the waveforms yield the waveform illustrated in FIG. 3, if when $\theta_1 \leq \theta < \theta_2$, the voltages are $v_1=V_{dc}$ and $v_2=-V_{dc}/2$. FIG. 6 shows the alternate waveforms generated during the capacitor discharging cycle. Their combination yields the waveform illustrated in FIG. 3, if when $\theta_1 \leq \theta < \theta_2$, the voltages are $v_1=0$ and $v_2=V_{dc}/2$.

Accordingly, by exploiting the fact that an output voltage of $V_{dc}/2$ an be achieved under two different sets of conditions, the capacitor voltage remains balanced. The criteria for keeping the capacitor balanced are: (1) the desired capacitor voltage is less than the DC-source voltage; (2) the capacitance is such that the variation of its voltage around its nominal value is relatively small (according to one particular embodiment, the capacitor-load constant time is greater than ten times the fundamental cycle time); and (3) the capacitor charging energy is greater than the capacitor discharge energy in a cycle. Moreover, by choosing the nominal value of the capacitor voltage to be one half that of the DC source, the nominal values of the levels are equally spaced with respect to one another, though this is not a necessary condition for the operation of the invention.

It follows that the adaptive hybrid energy system based on the electronic topology of the invention using, for example, the cascaded multilevel converter 300 comprising the two H-bridges $H_1$, $H_2$ described herein, needs only utilize one DC source to produce a sinusoidal voltage output. If only one DC source is available, therefore, the electronic topology can nonetheless provide a desired output voltage. If more than one DC sources are available, however, both DC sources can be utilized, each compensating the other. The electronic topology of the invention can integrate several DC sources, each generating within a range of zero to one hundred percent of its output capacity.

One of the advantages of the adaptive hybrid energy system according to the invention is that the system can provide adequate power even if one DC source is a stochastic source. Typical of such a source is wind power generated by wind turbines, which because it is only randomly available, is stochastic in nature. With the adaptive hybrid energy system of the invention, a stochastic source can be supplemented by a non-stochastic source, such as a fuel cell. The non-stochastic fuel cell can complement the stochastic wind power generated by the wind turbines. As already described, however, the desired output voltage can be provided when only one of the energy sources is available.

The particular embodiment in which one DC source of the adaptive hybrid energy system is wind power and the other is a fuel cell provides a good illustration of the operative aspects of the invention. Three different operating situations arise: (1) wind power is greater than the desired power, and the surplus is used to generate fuel for the fuel cell; (2) wind power is lower than the desired power, and the deficit in power is provided by the fuel cell with both sources complementing each other in providing the desired level of power; and (3) wind power is unavailable, and the fuel cell provides the desired level of power alone.

Figure 7:
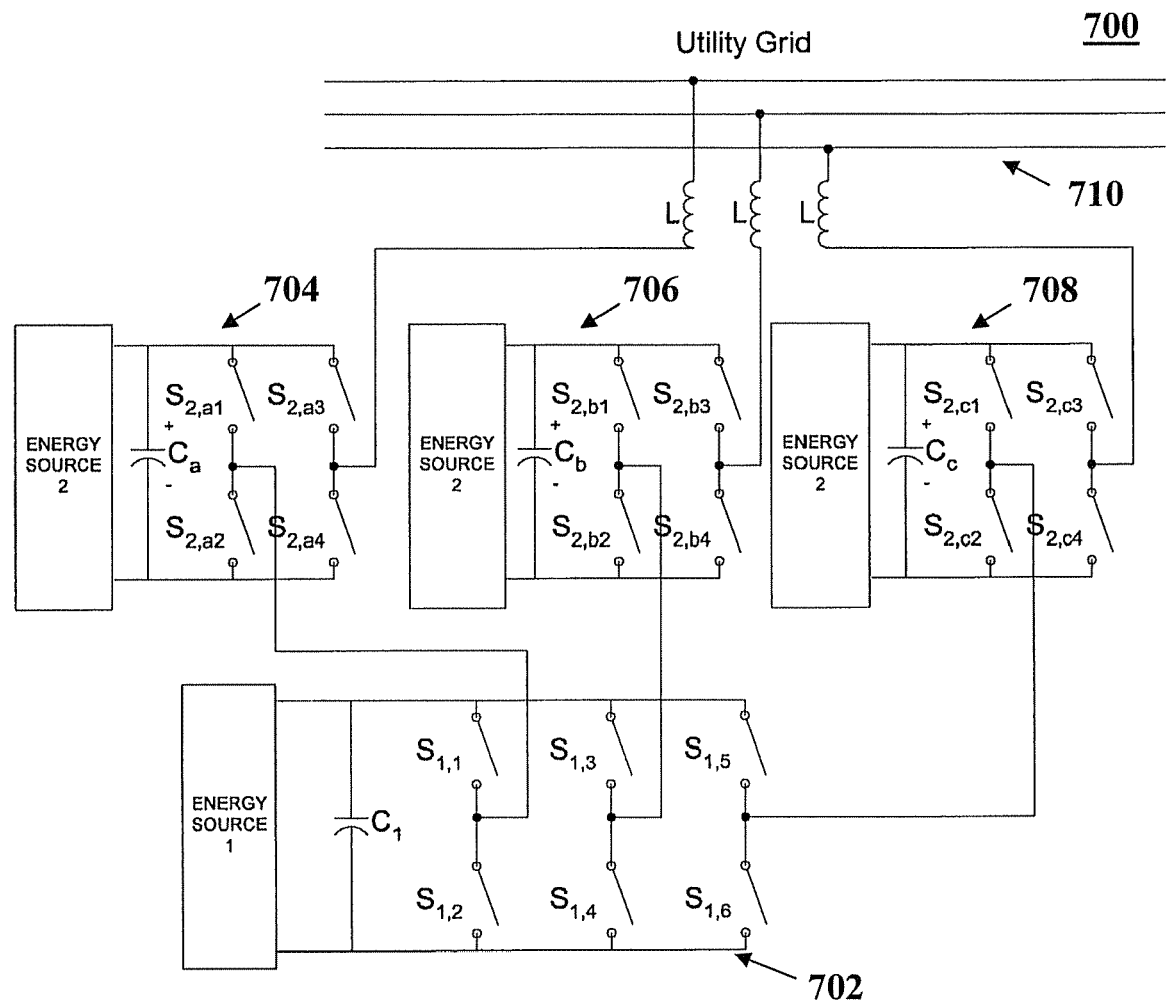
FIG. 7 is a schematic diagram of a cascaded bi-level bridge and H-bridge topology for hybrid energy systems, according to still another embodiment of the invention.

FIG. 7 schematically illustrates an adaptive power electronics interface 700 for a hybrid energy system, according to yet another embodiment of the invention. The adaptive power electronics interface 700, more particularly, comprises a multilevel converter that illustratively includes a six-switch, full-bridge converter 702 and three H-bridges 704, 706, 708 of the type already described. The full-bridge converter 702, as shown, connects to a first type of energy source. Each of H-bridges 704, 706, 708 connect to separate, individual energy sources that are of a second type different from the type of the first energy source. Operatively, the adaptive power electronics interface 700 performs in a manner similar to the various embodiments already described for integrating the different energy sources.

One type of energy source can be a renewable source, such as wind, and the other type of energy source can be, for example, a battery, a solar panel, or a fuel cell. Thus, as illustrated the full-bridge converter 702 can be connected to the first type of energy source, such as a fuel cell. Each of the H-bridges 704, 706, 708 then can be connected to separate, individual energy sources that are of a different type than the first, such as a plurality of wind turbines. The fuel cell can then provide complementary power to the three alternate power sources.

The different sources of power under the control of the multilevel converter comprising the six-switch, full-bridge converter 702 and three H-bridges 704, 706, 708 illustratively supply energy to a utility grid. Based upon the operations effected with the adaptive power electronics interface 700, if wind power is greater than the power requirements of the utility grid, then the surplus of power can be used to generate fuel for the fuel cell; the fuel cell is by-passed during the conveying of energy to the utility grid in this situation. If wind power is lower than the power required, then the power deficit is made up by power generated by the fuel cell; for example, the fuel cell can work in conjunction with one or more wind turbines generating power so that the combined power contributions are sufficient to meet the power requirement of the utility grid. If no wind power is supplied at any given time, then the fuel cell provides the requisite power on its own.

The operational difference between the electronic topology of the adaptive power electronics interface 700 and that described earlier is that if the full-bridge converter 702 is by-passed, the capacitor of the full-bridge converter can not be utilized to assist the H-bridges 704, 706, 708 so as to thereby decrease total switching frequency or increase instantaneous output. Accordingly, this topology provides less flexibility. It does, however, provide at least one advantage in that it utilizes fewer switches.

The foregoing description of preferred embodiments of the invention have been presented for the purposes of illustration. The description is not intended to limit the invention to the precise forms disclosed. Indeed, modifications and variations will be readily apparent from the foregoing description. Accordingly, it is intended that the scope of the invention not be limited by the detailed description provided herein.

We claim:

1. An adaptive hybrid energy system, the system comprising:
   a first DC electrical energy source that generates a first DC electrical output by converting energy from a first energy source into an electrical output;
   at least a second DC energy source that generates a second DC electrical output by converting energy from a second energy source into an electrical output; and
   a cascaded multilevel converter electrically connected to the first and second DC energy sources to convert a DC electrical output into a time-varying electrical output when at least one of the first and second DC energy sources is operable,
   wherein the converter comprises a first H-bridge connected to the first DC energy source and a second H-bridge and comprising a capacitor connected to the second DC energy source in a cascade arrangement with the first H-bridge, wherein a plurality of switching elements in the first and second H-bridges are configured to operate using a fundamental frequency switching method when the second DC energy source is inoperable so that the capacitor remains balanced over a complete energy cycle, and wherein a capacitor-load time constant of the converter is at least ten times the time of the complete energy cycle.

2. The system of claim 1, wherein the time-varying electrical output is an electrical output having a sinusoidal waveform.

3. The system of claim 1, wherein the energy from the second energy source is a type different than a type of the energy from the first energy source.

4. The system of claim 3, wherein the second energy source is a stochastic source of energy.

5. The system of claim 4, wherein the second energy source comprises a source of wind power.

6. The system of claim 1, wherein the first DC energy source comprises at least one wind turbine, and wherein the second DC energy source comprises one of a battery, a fuel cell, or a solar-based energy source.

7. The system of claim 1, wherein the first DC energy source charges the capacitor during a charging cycle when the second DC energy source is inoperable.

8. The system of claim 1, wherein the at least a second DC energy source comprises a third DC energy source, and wherein the cascaded multilevel converter further comprises a third H-bridge electrically connected to the third DC energy source such that the adaptive hybrid energy system is configured to generate a three-phase electrical output.

9. The system of claim 8, further comprising a bi-level bridge connected in a cascade arrangement to the first, second, and third H-bridges.

10. The system of claim 9, wherein the bi-level bridge comprises a six-switch bridge converter.

11. The system of claim 1, wherein the capacitor discharges during a discharging cycle when the second DC energy source is inoperable.

12. The system of claim 1, wherein the capacitor has a voltage equal to one-half times a voltage of the first DC energy source.

13. An electronic interface for controlling a hybrid energy system, the interface comprising:
    a first H-bridge converter that connects to a first DC energy source; and
    in a cascade arrangement with the first H-bridge converter, a second H-bridge converter that connects to a second DC energy source;
    wherein the second H-bridge converter comprises a capacitor, and wherein a plurality of switching elements in the first and second H-bridges are configured to operate using a fundamental frequency switch method so that the capacitor remains balanced over a complete electrical output cycle when the second DC energy source is inoperable, and wherein a capacitor-load time constant of the converter is at least ten times the time of the complete energy cycle.

14. The electronic interface of claim 13, wherein the first energy source provides a voltage $V_{dc}$ to the first H-bridge converter and the capacitor is configured to hold a voltage $1/2V_{dc}$, and wherein the plurality of switching elements are configured to cause said first H-bridge converter to selectively output a first voltage equal to one of 0V, $V_{dc}$, and $-V_{dc}$ and to cause said second H-bridge converter to selectively output a second voltage equal to one of 0V, $1/2V_{dc}$, and $-1/2V_d$, when the second DC energy source is inoperable, and wherein said cascade of said first and second H-bridges is configured to combine the first and second voltages to output said sinusoid waveform with voltage steps equal to one of $-3/2V_{dc}$, $-V_{dc}$, $-1/2V_{dc}$, 0V, $1/2V_{dc}$, $V_{dc}$, and $3/2V_{dc}$.

15. The electronic interface of claim 14, wherein said cascade of said first and second H-bridges is configured to combine the first and second voltages to output a sinusoid waveform with voltage steps equal to one of $-3/2V_{dc}$, $-V_{dc}$, $-1/2V_{dc}$, 0V, $1/2V_{dc}$, $V_{dc}$, and $3/2V_{dc}$.

16. The electronic interface of claim 13, wherein the first energy source provides a voltage $V_{dc}$ to the first H-bridge converter and the capacitor is configured to hold a voltage $1/2V_{dc}$, and wherein the plurality of switching elements are configured to cause said first H-bridge converter to selectively output a first voltage equal to one of 0V, $V_{dc}$, and $-V_{dc}$ and to cause said second H-bridge converter to selectively output a second voltage equal to one of 0V, $1/2V_{dc}$, and $-1/2V_{dc}$, when the second DC energy source is inoperable.

17. The electronic interface of claim 13, further comprising a third H-bridge connected to a third DC energy source that cooperatively operates with the first and second DC energy sources to supply energy for a three-phase output of the hybrid energy system.

18. The electronic interface of claim 17, further comprising a bi-level bridge in cascade arrangement with the first, second, and third H-bridge converters.

19. The electronic interface of claim 13, wherein the first DC energy source charges the capacitor during a charging cycle when the second DC energy source is inoperable.

20. The electronic interface of claim 13, wherein the capacitor discharges during a discharging cycle when the second DC energy source is inoperable.

21. The electronic interface of claim 13, wherein the capacitor has a voltage equal to one-half times a voltage of the first DC energy source.

* * * * *